United States Patent [19]

Kanamoto et al.

[11] 4,363,053

[45] Dec. 7, 1982

[54] SIGNAL REPRODUCING CIRCUIT

[75] Inventors: Yoshitaka Kanamoto, Kawasaki; Makoto Ishiodori, Ebina, both of Japan

[73] Assignee: Sony Corporation, Tokyo, Japan

[21] Appl. No.: 199,228

[22] Filed: Oct. 21, 1980

[30] Foreign Application Priority Data

Oct. 23, 1979 [JP] Japan .................. 54-136758

[51] Int. Cl.³ .............. G11B 5/02; G11B 5/04; H04N 5/78
[52] U.S. Cl. ........................ 360/67; 360/30; 360/33.1
[58] Field of Search ................ 360/29, 30, 33, 38, 360/65, 67

[56] References Cited

U.S. PATENT DOCUMENTS

| 3,117,278 | 6/1964 | Johnson | 360/65 |
| 3,436,490 | 4/1969 | Roelots | 360/65 |
| 3,927,420 | 12/1975 | Hayashi et al. | 360/65 |
| 4,152,733 | 5/1979 | Melwich | 360/30 |

Primary Examiner—Vincent P. Canney
Attorney, Agent, or Firm—Hill, Van Santen, Steadman, Chiara & Simpson

[57] ABSTRACT

An improved high boost circuit for a reproduced frequency modulated video signal is disclosed, wherein the third harmonic components of the reproduced f.m. video signal is suppressed, so that the undesired so-called over-modulating effect causing signal inversion is avoided at the boundary of different video signal levels.

5 Claims, 33 Drawing Figures

“SIGNAL REPRODUCING CIRCUIT

BACKGROUND OF THE INVENTION

1. Field of the Invention

This invention relates to a signal reproducing circuit for reproducing angular modulated signals recorded on a recording medium in a video tape recorder (hereinafter referred to as VTR) or the like, and more particularly the invention provides said type of angular modulated signal reproducing circuit which can prevent the so-called "signal inversion" induced by an abrupt change of the signal level to obtain a high-quality reproduced output signal free of S/N deterioration.

2. Description of the Prior Art

In the video recording and/or reproducing apparatus such as VTR, recording on a magnetic recording medium or reproduction of the recorded information is usually accomplished by utilizing angular modulation, particularly frequency modulation. In such magnetic recording and reproducing system, particularly the one in which the relative speeds of the magnetic recording medium and the magnetic transducer head are low and also the track is very narrow in width, it is possible to attain an improvement of S/N by treating the frequency modulated video signal with high deviation and high emphasis. However, in such signal recording or reproduction with high deviation and high emphasis, particularly in case of reproducing an image which undergoes an abrupt change in luminance signal level of the picture signal, for example, an image which changes from black to white in the horizontal scanning direction on the screen, there may take place "signal inversion", that is, horizontal black streaks 4 are formed in the white region 2 from the boundary line 3 where the black region 1 changes into the white region 2 as shown in FIG. 1.

The reasons for causing such signal inversion may be explained as follows. The video signal, such as shown in FIG. 2A, of an image changing from black to white in the horizontal scanning direction on the screen is, in a VTR device, pre-emphasized before frequency modulation, so that such video signal may have an over-shoot at the portion where the black level changes into the white level as shown in FIG. 2B. In a VTR of a low carrier frequency FM system, when said recording video signal is angle-modulated by an angular modulator, the carrier level at said portion of over-shooting is attenuated, since such carrier level is high at said portion. Also, there is produced an amplitude modulation component at said portion of an over-shoot due to transient distortion in the signal transmission system or phase rotation caused by the high-pass filter, and it follows that the zero-crossing shift of the reproduced angle modulated signal, that is, the crests and troughs of the carrier wave do not cross the detecting line as shown in FIG. 2C. Therefore, when said reproduced angle modulated signal is wave shaped through a hard limiter in the signal reproduction system, there is induced dropout of pulse as shown in FIG. 2D to make it impossible to effect high-fidelity demodulation, and this leads to "signal inversion", that is, the region where the black level of the final reproduced video signal has changed into the white level is still regarded as black level as shown in FIG. 2E.

Such signal inversion can be prevented by emphasizing the high frequency component of the carrier before limiting the amplitude of the reproduced angle modulated signal. Such high frequency emphasis elevates the carrier level at the over-shoot portion of the reproduced angle modulated signal, so that no dropout of pulse is caused even if amplitude limiting is made in the later stage.

Generally, however, in a VTR of the low carrier frequency FM system, S/N of the high level component of the carrier is poor, and the more emphasized is this high frequency component, the more deteriorated is S/N of the reproduced video signal obtained after demodulation. Thus, there is a dilemma that an attempt to prevent said signal inversion leads to deterioration of S/N and an attempt to better S/N leads to the signal inversion.

A circuit such as shown in FIG. 3 has been proposed as a magnetic recording and reproducing system for obtaining high-quality demodulated output signal by eliminating said dilemma to allow prevention of the signal inversion without causing S/N deterioration.

In the magnetic recording and reproducing system shown in FIG. 3, an input video signal ($Y_{in}$ signal) with a frequency distribution condition such as shown in FIG. 4A is fed to the signal input terminal 10, and this input video signal is angle modulated by an angular modulation circuit 11 including a pre-emphasis circuit and thereby converted into an angle modulated signal (Y-FM signal) having an upper side band and a lower side band such as shown in FIG. 4B, and such signal is recorded on a magnetic tape 13 through a recording magnetic head 12. Here, it is assumed that an input video signal ($Y_{in}$ signal) of a waveform shown in FIG. 2A is supplied to said signal input terminal 10. The angle modulated signal (Y-FM signal) recorded on said magnetic tape 13 is picked up by the reproducing magnetic head 14, converted into a reproduced angle modulated signal ($Y_{out}$-FM signal) with its usually upper side band being suppressed as shown in FIG. 4C and output through a reproducing amplifier 15. The waveform of the reproduced angle modulated signal ($Y_{out}$-FM signal) obtained through said reproducing amplifier 15 is as shown in FIG. 2C. Said reproduced angle modulated signal ($Y_{out}$-FM signal) is limited to a slight degree of a soft limiter circuit 16 with limiter gain of the order of 10–12 dB, and as a result, the upper side band is regenerated by the lower side band component of the $Y_{out}$-FM signal as shown in FIG. 4D. The reproduced angle modulated signal ($Y_{out}$-FM signal) having its upper side band regenerated as above presents a waveform with its zero-crossing section shaped as shown in FIG. 2F, and then this signal is passed through a high emphasis circuit 17 having a frequency characteristic such as shown in FIG. 4E whereby it is changed into a frequency distribution pattern with its high frequency signal component emphasized as shown in FIG. 4F and then is supplied to an angle demodulation circuit 19 through a hard limiter circuit 18 with limiter gain of the order to 40–50 dB. Here, the S/N ratio of the upper side band of the reproduced angle modulated signal ($Y_{out}$-FM signal) obtained through said reproducing amplifier 15 is bad, but the upper side band of the reproduced angle modulated signal ($Y_{out}$-FM' signal) can be regenerated through the soft limiter circuit 16, so that the total S/N ratio of the signal is improved. Therefore, no S/N deterioration of the signal is caused even if the high frequency component is emphasized by the high emphasis circuit 17. Thus, supposing here that an input video signal ($Y_{in}$ signal) with a waveform such as shown in FIG. 2A is being supplied to the signal input terminal 10, then the reproduced angle modulated signal ($Y_{our}$-FM signal) of FIG. 2C obtained through the reproducing amplifier 15 is limited by the soft limiter circuit 16 to obtain a signal ($Y_{our}$-FM' signal) with a waveform such as shown in FIG. 2F, and further the high frequency component of this signal is emphasized by the high emphasis circuit 17 to allow correct zero-crossing as shown in FIG. 2G and then limited by the hard limiter 18. The output signal obtained through the hard limiter 18 can be correctly demodulated by a demodulator 19 without causing any dropout of pulse as shown in FIG. 2H. FIG. 2I shows the waveform of the demodulated output signal obtained after angle demodulation by said demodulator 19.

It is to be also noted that in the magnetic recording and reproducing system of the construction such as shown in FIG. 3, because of low carrier level at the section where the luminance signal level of the image changes sharply, the third harmonic component of the carrier of the reproduced angle modulated signal limited by the soft limiter circuit 16 tends to be emphasized by the high emphasis circuit 17, and if the gain of said high emphasis is too large, said third harmonic component comes to cross the detecting line to cause the signal inversion.

For instance, in case of recording or reproducing an input video signal which undergoes a change from white level to black level and also involves under-shoot by pre-emphasis as shown in FIG. 5A, the reproduced angle modulated signal such as shown in FIG. 5B obtained from the reproducing amplifier 15 is amplitude-controlled as shown in FIG. 5C through the soft limiter circuit 16, but if the gain of the high emphasis circuit 17 is too large, the third harmonic component of the carrier of said reproduced angle modulated signal is emphasized as shown in FIG. 5D, so that if this signal is subjected to amplitude limiting by the hard limiter circuit 18, there is produced an unnecessary pulse $P_e$ as shown in FIG. 5E and such unnecessary pulse $P_e$ is judged as white level by the demodulator 19, causing inversion due to white over-modulation.

SUMMARY OF THE INVENTION

An object of the present invention is to provide a novel signal reproducing circuit.

Another object of the present invention is to provide a novel high boost circuit for an angle modulated signal reproduced from a magnetic tape.

The reproducing circuit according to the present invention is used before frequency modulation of the reproduced frequency modulated video signal.

The reproducing circuit according to the present invention comprises a high boost circuit using a delay line. A feature of the circuit of the present invention is that it has a limiter function for suppressing the third harmonic component. Supposing that the delay time of the delay line used in the high boost circuit is $\tau$, then there is obtained a composite signal of the reflected wave of the $2\tau$-delayed delay line and the input signal. Since the third harmonic component of the input signal is emphasized, said composite signal, when properly limited, can weaken the third harmonic component.

The high boost circuit according to the present invention is connected between the soft limiter circuit and the hard limiter circuit in a frequency modulated video reproducing circuit.

The above mentioned and other objects and features of the invention will become apparent from the following detailed description taken in conjunction with the drawings which indicate embodiments of the invention.

DETAILED DESCRIPTION OF THE INVENTION

Figure 1:
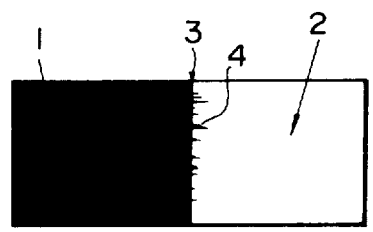
FIG. 1, consisting of A-E, is a diagrammatic drawing illustrating the phenomenon of inversion.
Figure 2:
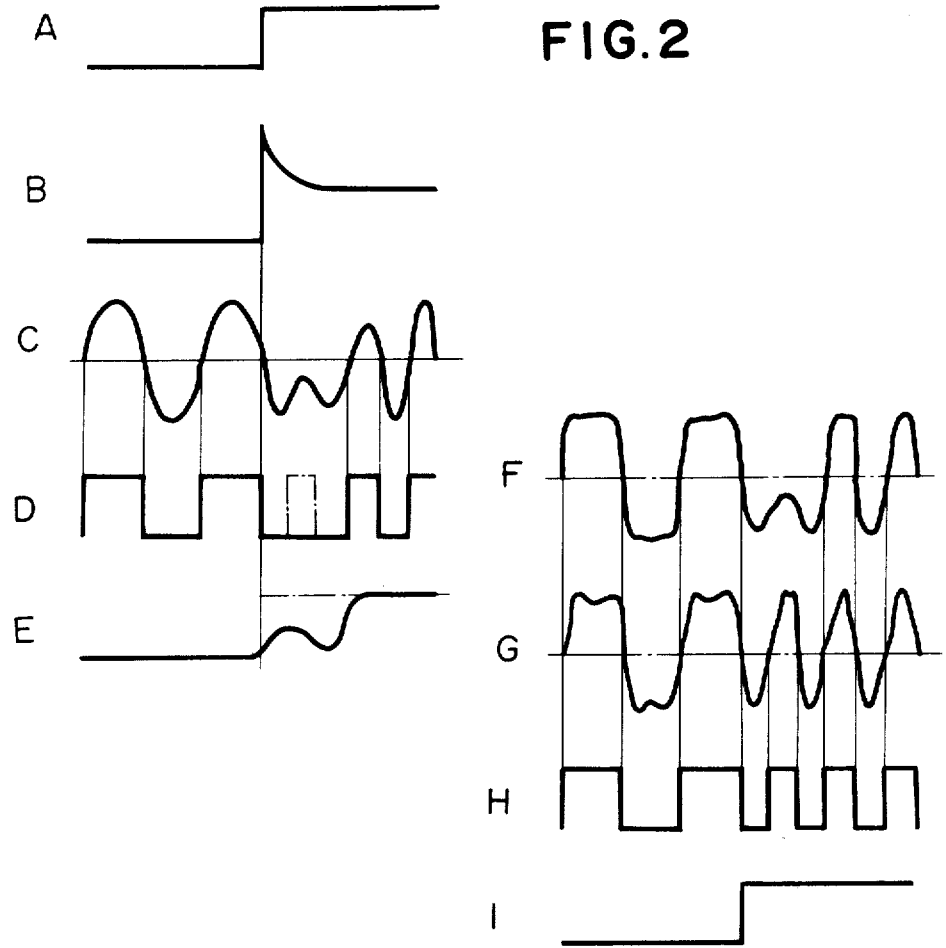
FIG. 2, continuing with FIGS. F-I, shows the waveforms for electrically explaining the cause of said inversion.
Figure 3:
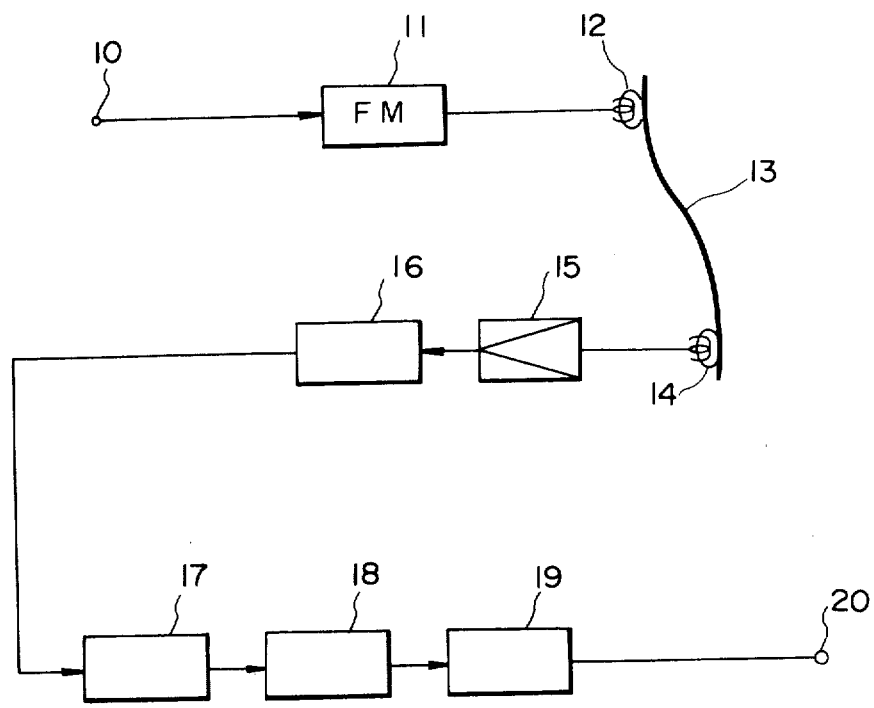
FIG. 3 is a magnetic recording and reproducing circuitry arrangement designed to prevent such an inversion.
Figure 4:
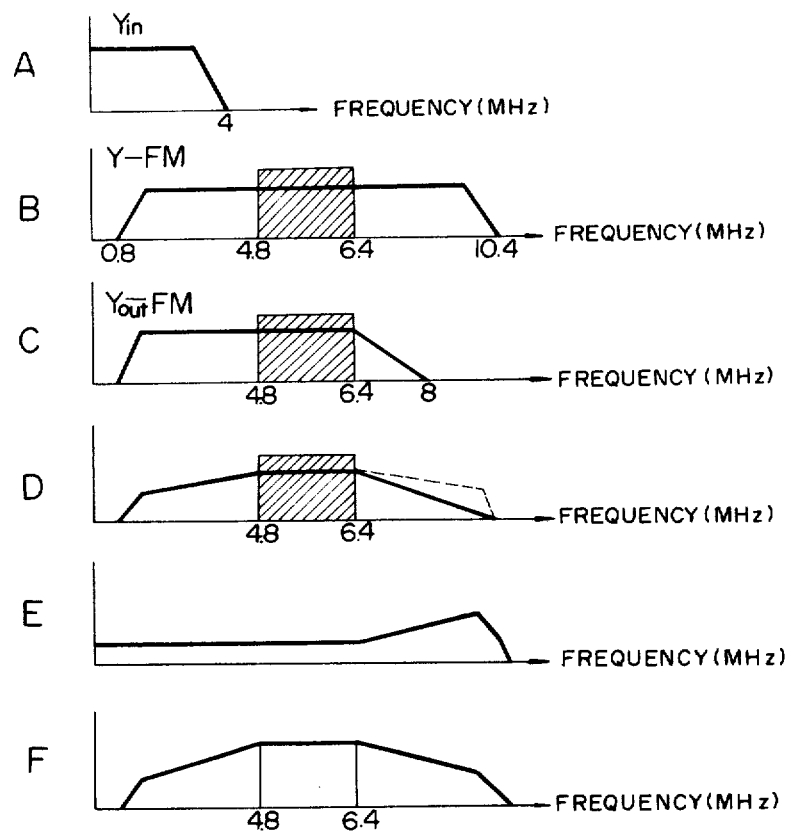
FIG. 4, consisting of A-F, shows the frequency distribution patterns for illustrating the operation of said magnetic recording and reproducing system.
Figure 5:
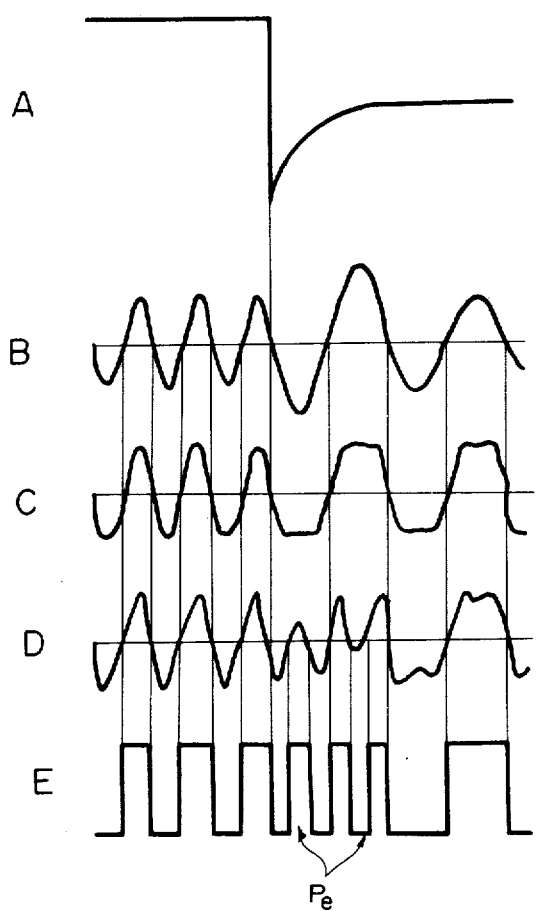
FIG. 5, consisting of A-E, shows the waveforms for electrically explaining the cause of occurrence of such inversion which can not be avoided in said magnetic recording and reproducing system.
Figure 6:
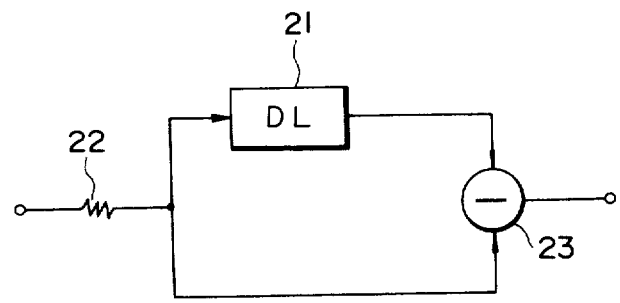
FIG. 6 is a block diagram showing the arrangement of a high emphasis circuit in said magnetic recording and reproducing system.
Figure 7:
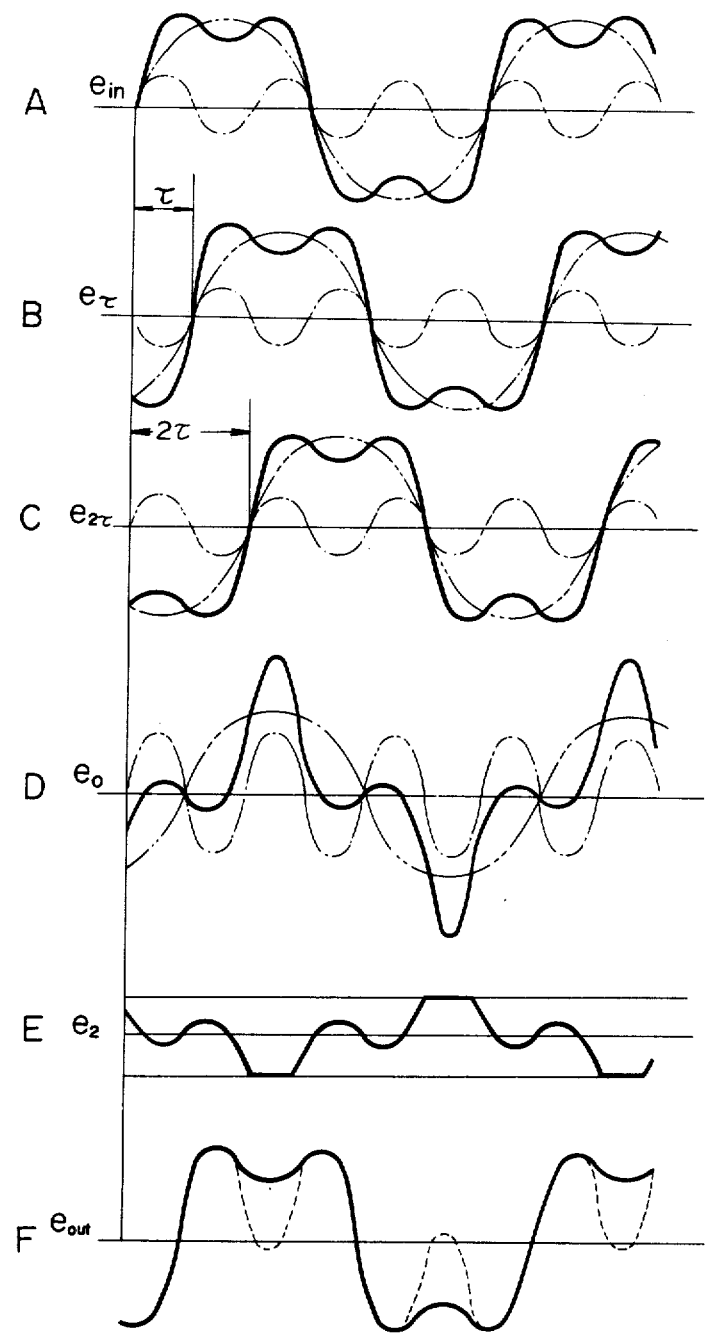
FIG. 7, consisting of A-F, shows the waveforms for illustrating the operation of said high emphasis circuit.

Before describing the embodiments of the present invention, we briefly explain the high emphasis circuit 17 in the magnetic recording and reproducing system shown in FIG. 3. Generally, a so-called aperture-compensating circuit of a construction such as shown in FIG. 6, involving a delay circuit 21, is used as the high emphasis circuit 17 in a magnetic recording and reproducing system. Said delay circuit 21 has a delay characteristic with unit delay time of $\tau$. The reproduced angle modulated original signal $e_{in}$ (whose waveform is shown in FIG. 7A) supplied through a matching resistance 22 is given to an adding circuit 23 as a signal $e_\tau$ delayed by a delay time $\tau$ by said delay circuit 21 and is also combined with the signal delayed by a delay time $2\tau$ as reflected wave to form a composite signal $e_o$. As shown in detail in FIG. 8, the adding circuit 23 consists of two differentially connected transistors 24, 25, and it adds the composite signal $e_o$ in an opposite phase to said delay signal $e_\tau$ with ½ gain to output a reproduced angle modulated signal $e_{out}$ having a waveform such as shown in FIG. 7F. The thus obtained reproduced angle modulated signal $e_{out}$ has its basic wave component suppressed and its third harmonic component emphasized, but if this third harmonic component is over-emphasized, there is induced white over-modulation as shown by the broken lines in FIG. 7F. Such white over-modulation may be prevented by subjecting said composite signal to amplitude limiting to remove the unnecessary portions associated with the third harmonic component as shown in FIG. 7E.

In the present invention, therefore, amplitude limiting is made on the signal which has its third harmonic component emphasized and which is obtained by adding the reproduced angle modulated original signal and the signal delayed by a time $2\tau$, or double the unit delay time $\tau$, and this amplitude-limited signal is added, in opposite phases, with a signal delayed by a unit delay time from said original signal to obtain a reproduced angle modulated signal having its high level component emphasized, thereby inhibiting generation of any unnecessary pulse by the third harmonic component to prevent the signal inversion.

Figure 8:
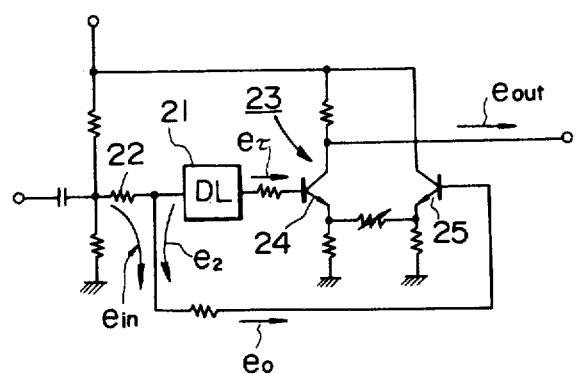
FIG. 8 is a circuit diagram showing the detail constitution of said high emphasis circuit.
Figure 9:
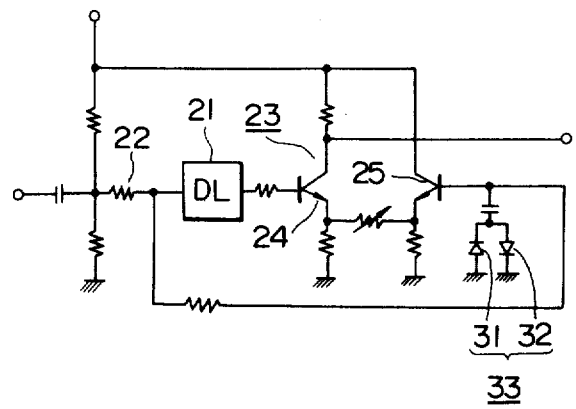
FIG. 9 is a circuit diagram showing an embodiment of the present invention comprising a modified version of the high emphasis circuit of FIG. 8.
Figure 10:
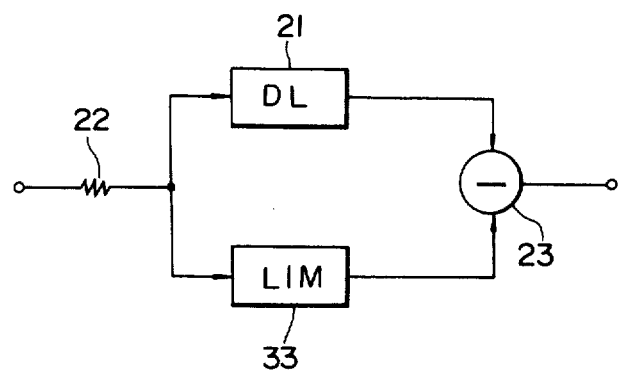
FIG. 10 is an equivalent block diagram of the said embodiment of the present invention.

The embodiment shown in FIG. 9 is a modification of the high emphasis circuit of FIG. 8, in which an amplitude limiting circuit 33 having two diodes 31, 32 connected in opposite directions to each other is AC connected to the base of one of the two transistors 24, 25 constituting a signal adding circuit 23, that is, the transistor 25 to which said composite signal $e_o$ is supplied. In this embodiment, the component parts other than said amplitude limiting circuit are same as those used in the high emphasis circuit shown in FIG. 8, so that the like reference numerals are used in the drawing to indicate the corresponding component elements, and the detailed explanation of such elements is omitted. The embodiment of such construction may be depicted by an equivalent block diagram as shown in FIG. 10. In this embodiment, since the composite signal $e_o$ consists of the original signal $e_{in}$ and the reflected wave signal $e_{2\tau}$, the function of transfer at the connecting point of the matching resistance 22 where said composite signal $e_o$ is obtained and the delay circuit 21 is given as follows:

$$e_o = e_{in}(1 + e^{-j2\omega\tau})$$
$$= e_{in}(1 + \cos 2\omega\tau - j\sin 2\omega\tau)$$

The gain G is:

$$G = \left| \frac{e_o}{e_{in}} \right| = \sqrt{2(1 + \cos 2\omega\tau)}$$

The phase Q is:

$$Q = \tan^{-1} \frac{-\sin 2\omega\tau}{1 + \cos 2\omega\tau}$$
$$= \tan^{-1} X$$

The group delay $-dQ/d\omega$ is $$-\frac{dQ}{d\omega} = -\frac{1}{1+X^2} \cdot \frac{dX}{d\omega}$$

$$= \frac{1}{1 + \frac{\sin^2 2\omega\tau}{(1 + \cos 2\omega\tau)^2}} \cdot \left[ (-\sin 2\omega\tau)'\right.$$

$$\cdot \left(\frac{1}{a + \cos 2\omega\tau}\right) - (-\sin 2\omega\tau)$$

$$\left. \cdot \left(\frac{1}{1 + \cos 2\omega\tau}\right)\right]$$

$$= \frac{1}{1 + \frac{\sin^2 2\omega\tau}{(1 + \cos 2\omega\tau)^2}} \cdot \left[\frac{2\tau\cos 2\omega\tau}{1 + \cos 2\omega\tau}\right.$$

$$\left. + \frac{2\tau \cdot \sin^2 2\omega\tau}{(1 + \cos 2\omega\tau)^2}\right]$$

$$= \frac{(1 + \cos 2\omega\tau)^2}{(1 + \cos 2\omega\tau)^2 + \sin^2 2\omega\tau} \cdot$$

$$\left[\frac{2\tau \cdot (\cos 2\omega\tau + 1)}{(1 + \cos 2\omega\tau)^2}\right]$$

$$= \frac{2\tau(1 + \cos 2\omega\tau)}{2(1 + \cos 2\omega\tau)} = \tau$$

Thus, $\tau$ is constant regardless of the frequency.

In this embodiment, as described above, amplitude limiting is made on the composite signal $e_o$ obtained by adding the original signal $e_{in}$ and the reflected wave signal $e_{2\tau}$ by the delay circuit 21, so that the peaks and dips of the signal level are eliminated by the particularly emphasized third harmonic component in said composite signal $e_o$. Therefore, in the signal adding circuit, the limiter output signal $e_2$ of the waveform such as shown as shown in FIG. 7E and said one-time reflected wave signal $e_\tau$ are added to obtain an angle modulated reproduced output signal $e_{out}$ with no zero-crossing as shown by the solid line in FIG. 7F.

Figure 11:
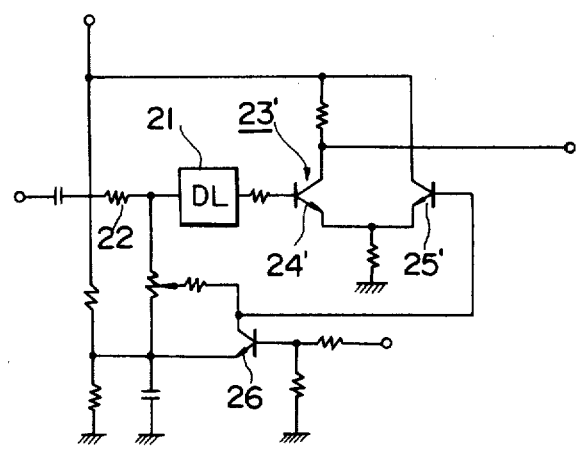
FIG. 11 is a circuit diagram, showing another embodiment of the present invention.

Said amplitude limiting can be accomplished by utilizing the transistor base-emitter voltage $V_{BE}$ instead of using an amplitude limiting circuit 33 consisting of two oppositely connected diodes 31, 32 as in the above-described embodiment. For example, in the embodiment shown in FIG. 11, a differential amplifier consisting of two transistors 24', 25' having their respective emitters connected in common to each other is used as signal addition circuit 23' so as to perform amplitude limiting of said composite signal $e_o$ by the base-emitter voltage $V_{BE1}$ of the transistor 25' to the base of which is supplied the composite signal $e_o$. The transistor 26 in FIG. 11 is a switching transistor which is either energized or deenergized according to the mode of the operation of the magnetic recording and reproducing system, that is, it is energized during the EE mode and REC mode to cut off supply of the composite signal $e_o$ to said signal addition circuit 23.

Thus, according to the present invention, as described above in connection with the embodiments thereof, emphasis of the high level component is attained while suppressing the third harmonic component which is a potential factor of inversion, so that it is possible to positively inhibit inversion without causing S/N deterioration and to obtain a high-quality angle modulated reproduced signal.

It will be apparent to those skilled in the art that many modifications and variations may be effected without departing from the spirit and scope of the novel concepts of the present invention.

We claim as our invention:

1. Signal reproducing circuit for an angular modulated signal, comprising:
    (a) a delay means for receiving and delaying an incoming angular modulated signal by predetermined times $\tau$, and $2\tau$;

(b) a mixing means for mixing said incoming angular modulated signal and said $2\tau$-delayed angular modulated signal;

(c) a signal limiter means receiving the output of said mixing means and limiting the amplitude of signals derived from said mixing means; and (d) an adding means receiving the outputs of said delay means and said signal limiter means and adding in said opposite polarity the signals from said signal limiter means and $\tau$-delayed angular modulated signal, whereby an equalized angular modulated signal is derived from said adding means.

2. Signal reproducing circuit as claimed in claim 1, wherein said delay means includes a delay line which delays said angular modulated signal and produces a $\tau$-delayed angular modulated signal at its output and a $2\tau$-delayed angular modulated signal at its input.

3. Signal reproducing circuit as claimed in claim 2, wherein said mixing means is an input circuit of said delay line, and an output line for said mixing means being derived from said input circuit of said delay line.

4. Signal reproducing circuit as claimed in claim 3, wherein said output line is connected to said adding means by way of said signal limiter means.

5. Signal reproducing circuit as claimed in claim 2, wherein said adding means includes a differential amplifier having a pair of input terminals, one of said input terminals being connected to said output of the delay line and the other of said input terminals being connected to said input of said delay line by way of said signal limiter means.

* * * * *